United States Patent
Kuroki et al.

(10) Patent No.: US 6,418,737 B1
(45) Date of Patent: Jul. 16, 2002

(54) HEAT PUMP TYPE HOT-WATER SUPPLY SYSTEM CAPABLE OF PERFORMING DEFROSTING OPERATION

(75) Inventors: Jyouji Kuroki, Kariya; Hisayoshi Sakakibara, Nishio; Masahiko Ito, Nagoya; Tomoaki Kobayakawa, Tokyo; Kazutoshi Kusakari, Urawa; Michiyuki Saikawa, Zushi, all of (JP)

(73) Assignees: Denso Corporation, Kariya; Tokyo Electric Power Company; Central Research Institute of Electric Power Industry, both of Tokyo, all of (JP)

(*) Notice: Subject to any disclaimer, the term of this patent is extended or adjusted under 35 U.S.C. 154(b) by 0 days.

(21) Appl. No.: 09/656,487

(22) Filed: Sep. 7, 2000

(30) Foreign Application Priority Data

Sep. 13, 1999 (JP) .............................. 11-258812

(51) Int. Cl.$^7$ .............................................. F24H 1/00
(52) U.S. Cl. ..................... 62/156; 62/238.6; 62/277
(58) Field of Search ..................... 62/151, 156, 277, 62/278, 238.6, 238.7, 81

(56) References Cited

U.S. PATENT DOCUMENTS 4,770,000 A     9/1988  Kuroda et al.
5,921,092 A  *  7/1999  Behr et al. ................. 62/277 X

FOREIGN PATENT DOCUMENTS

| JP | A-60-181552 | 9/1985 |
| JP | A-61-184366 | 8/1986 |
| JP | A-10-89816  | 4/1998 |

* cited by examiner

Primary Examiner—Harry B. Tanner
(74) Attorney, Agent, or Firm—Harness, Dickey & Pierce, PLC

(57) ABSTRACT

A heat pump type hot-water supply system performs an ordinary operation for heating liquid stored in a reservoir by circulating the liquid in a heat exchanger for supplying hot water. When an outlet temperature of an exterior heat exchanger is lowered to about −5° C., the ordinary operation is switched to a defrosting operation, and an opening degree of an expansion valve is decreases as compared to that at the ordinary operation. Accordingly, hot gas discharged from a compressor radiates a decreased amount of thermal energy in the heat exchanger for supplying the hot gas. Hot gas discharged from the compressor can reach the exterior heat exchanger without lowering its temperature largely to perform defrosting of the exterior heat exchanger.

13 Claims, 3 Drawing Sheets

HEAT PUMP TYPE HOT-WATER SUPPLY SYSTEM CAPABLE OF PERFORMING DEFROSTING OPERATION

CROSS REFERENCE TO RELATED APPLICATION

This application is based upon and claims the benefit of Japanese Patent Application No. 11-258812 filed on Sep. 13, 1999, the contents of which are incorporated herein by reference.

BACKGROUND OF THE INVENTION

1. Field of the Invention

This invention relates to a heat pump type hot-water supply system.

2. Description of the Related Art

JP-A-10-89816 discloses a heat pump type hot-water supply system. This system changes a flow direction of refrigerant circulating in a refrigerant circuit between a hot-water supply operation and a defrosting operation. Accordingly, a water heat exchanger that works as a condenser at the hot-water supply operation is used as an evaporator at the defrosting operation, while an exterior heat exchanger that works as an evaporator at the hot-water supply operation is used as a condenser at the defrosting operation. Heat of hot water heated at the hot-water supply operation is absorbed by the water heat exchanger, and is radiated in the frosted exterior heat exchanger to perform defrosting of the exterior heat exchanger.

In an air conditioning system disclosed JP-B2-7-99297, a bypass pipe is branched from a discharge side pipe of a compressor, and is connected to an inlet side pipe of an exterior heat exchanger. Accordingly, part of high-temperature gas discharged from the compressor is conducted into the bypass pipe to perform defrosting of the exterior heat exchanger.

In the conventional systems, however, plural functional parts must be provided for selecting the hot-water supply operation or the defrosting operation. Specifically, the system using the exterior heat exchanger as the condenser at the defrosting operation requires a four-way valve and several switching valves for changing the refrigerant flow direction. The system in which high-temperature gas discharged from the compressor is conducted directly into the exterior heat exchanger requires the bypass pipe, several switching valves, and the like. Therefore, system cost is increased in theses systems, and the cycle constitutions are complicated, thereby lowering reliability of the systems.

Especially in a case where the heat pump cycle uses $CO_2$ as refrigerant and pressurizes it up to a critical pressure or more, the four-way valve and the switching valves for opening or closing the refrigerant passage are required to have high accuracy sealing properties resistant to high pressure. Such valves are very expensive, and further increases the system cost.

SUMMARY OF THE INVENTION

The present invention has been made in view of the above problems. An object of the present invention is to provide a heat pump type hot-water supply system capable of performing defrosting operation at low cost and high reliability of the system.

In a heat pump type hot-water supply system according to the present invention, at a defrosting operation, an opening degree of a pressure-reducing device is controlled to be larger than that at an ordinary operation at which liquid stored in a reservoir is circulated and is heated in a first heat exchanger for supplying hot gas. Further, a pump for circulating liquid is stopped. Accordingly, high-temperature refrigerant (hot gas) discharged from a compressor radiates a decreased amount of thermal energy in the first heat exchanger. A decrease in pressure of hot gas in the pressure-reducing device is also suppressed. As a result, hot gas discharged from the compressor can reach a second heat exchanger without lowering its temperature largely and perform defrosting of the second heat exchanger. These effects can be provided with a simple cycle structure at low cost.

At the defrosting operation, liquid heated and stored in the reservoir may be supplied into the first heat exchanger in the state where the opening degree of the pressure-reducing device is larger than that at the ordinary operation. In this case, heated liquid raises temperature of the body of the first heat exchanger. Accordingly, the decrease in temperature of hot gas in the first heat exchanger can be suppressed, thereby suppressing thermal loss of hot gas in the first heat exchanger. The defrosting time is therefore shortened.

Heated liquid may be supplied into the first heat exchanger continuously during the defrosting operation. In this case, first, the thermal energy of heated liquid is consumed to raise the temperature of the first heat exchanger body. After that, as soon as the temperature of the first heat exchanger body is increased not to cause thermal loss of hot gas, the liquid is used to heat hot gas. Accordingly, defrosting of the second heat exchanger can be performed for a further shortened time.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENTS

First Embodiment

Figure 1:
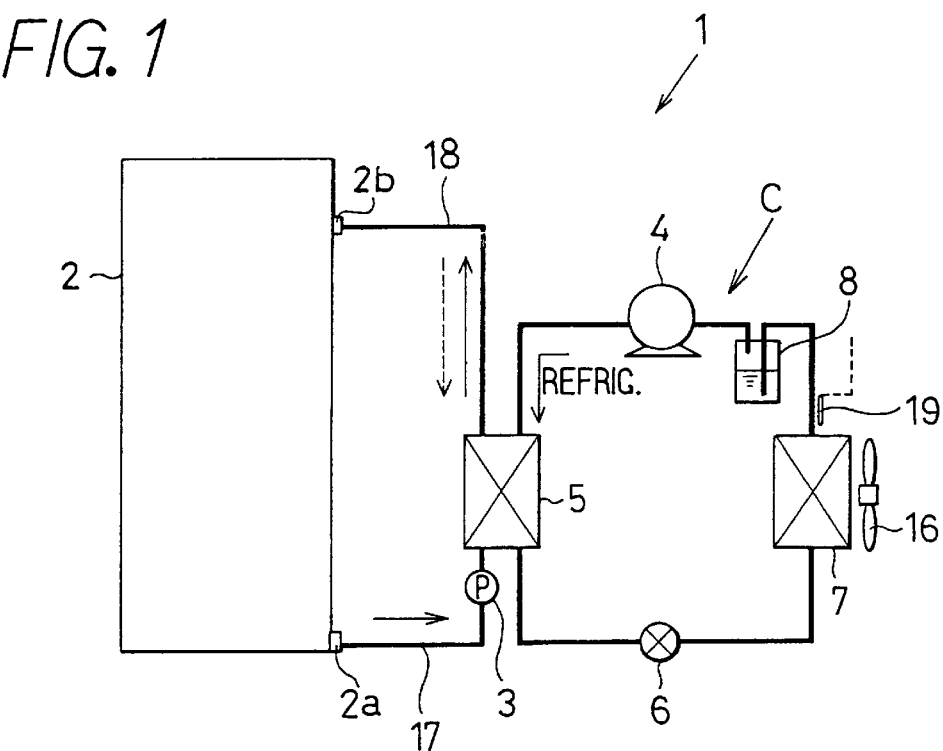
FIG. 1 is a block diagram showing a heat pump type hot-water supply system in a first preferred embodiment.

Referring to FIG. 1, a heat pump type hot-water supply system 1 in a first preferred embodiment is composed of a reservoir 2 that stores liquid (for instance, water) for supplying hot water, a heat pump cycle C for heating liquid, a circulation passage (described below) through which liquid in the reservoir 2 circulates, a water pump 3 for circulating liquid in the circulation passage, a control unit (not shown) for controlling the hot-water supply system 1, and the like.

The heat pump cycle C has a compressor 4, a heat exchanger 5 for supplying hot water, an expansion valve 6, an exterior heat exchanger 7, and an accumulator 8 which are connected in sequence via pipes. The heat pump cycle C uses $CO_2$ as refrigerant.

The compressor 4 is driven by an electric motor (not shown) accommodated therein, and compresses gaseous phase refrigerant, which is discharged from the accumulator 5, up to a critical pressure or more, and discharges it. The heat exchanger 5 for supplying hot water exchanges heat between high-temperature refrigerant (hot gas) discharged from the compressor 4 and liquid supplied from the reservoir 2. The heat exchanger 5 has a refrigerant passage (not shown) in which refrigerant flows in a refrigerant flow direction and a liquid passage (not shown) in which liquid flows in a liquid flow direction opposite to the refrigerant flow direction. Since refrigerant ($CO_2$) flowing in the heat exchanger 5 has been pressurized by the compressor 4 to have a critical pressure at least, the refrigerant does not condense even when it radiates heat to lower the temperature of liquid flowing in the heat exchanger 5.

Figure 2:
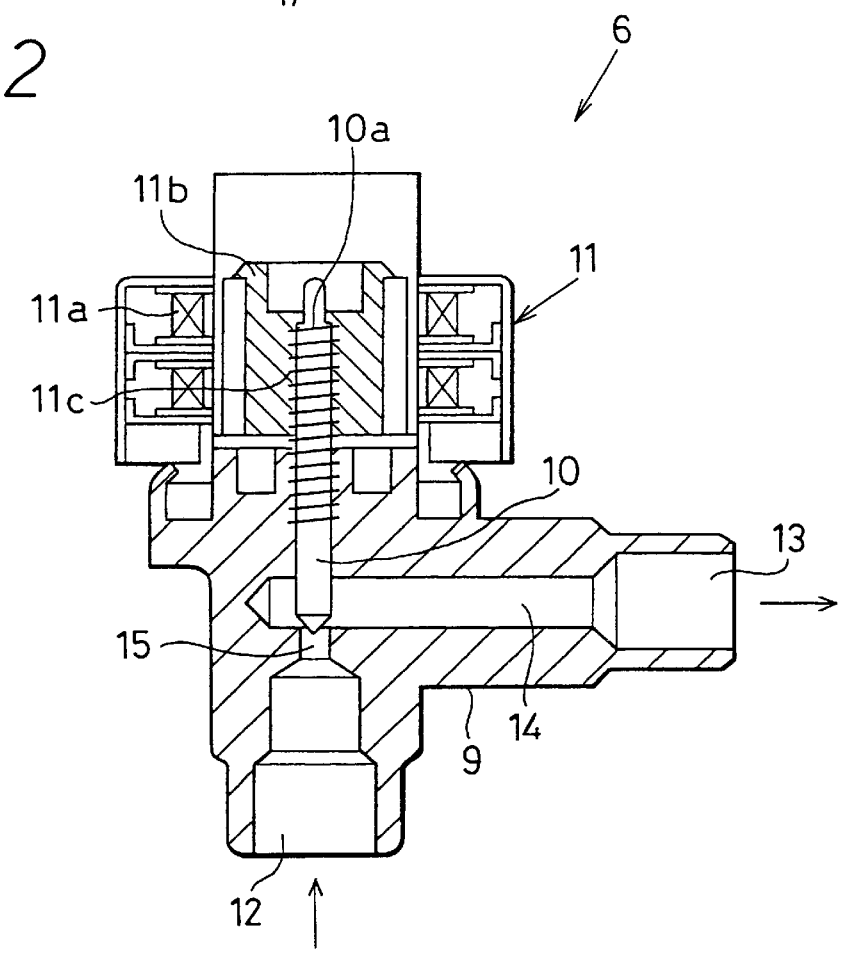
FIG. 2 is a cross-sectional view showing an expansion valve in the first embodiment.

The expansion valve 6 is a pressure-reducing device that reduces a pressure of refrigerant discharged from the heat exchanger 5, in accordance with an opening degree thereof. The control unit electrically controls the opening degree. An example of the expansion valve 6 is explained with reference to FIG. 2.

The expansion valve 6 is composed of a housing 9, a valve member 10 integrated in the housing 9, an electromagnetic actuator 11, and the like. The housing 9 has a flow inlet 12 communicating with an outlet side of the heat exchanger 5, a flow outlet 13 communicating with an inlet side of the exterior heat exchanger 7, and a refrigerant passage 14 connecting the flow inlet 12 and the flow outlet 13. A valve orifice 15 is provided on the way of the refrigerant passage 14.

The valve member 10 has a needle shape with a conical front edge portion (lower end in FIG. 2) facing the valve orifice 15 and adjusts the opening degree of the valve orifice 15. Specifically, the valve member 10 is driven by the electromagnetic actuator 11 to move in the vertical direction in FIG. 2, thereby changing the opening cross-sectional area (opening degree) of the valve orifice 15. Incidentally, an external thread portion 10a is provided on the rear side (upper side in FIG. 2) of the valve member 10.

The electromagnetic actuator 11 is a step motor having a coil 11a that is controlled by the control unit upon receiving electricity, and a magnet rotor 11b that rotates upon receiving magnetic force of the coil 11a. An internal thread portion 11c is provided at the central portion of the magnet rotor 11b, and connected to the external thread portion 10a of the valve member 10 by screwing. Accordingly, when the magnet rotor 11b rotates upon receiving the magnetic force of the coil 11a, the valve member 10 moves in the vertical direction in FIG. 1 in accordance with the rotational angle of the magnet rotor 11b, thereby changing the opening degree of the valve orifice 15.

The exterior heat exchanger 7 (heat exchanger for heat source) evaporates refrigerant, which has been decompressed by the expansion valve 6, by exchanging heat with outside air blown off from a fan 16. The accumulator 8 divides refrigerant discharged from the exterior heat exchanger 7 into liquid phase refrigerant and gaseous phase refrigerant, conducts only gaseous phase refrigerant toward the compressor 4, ands stores therein surplus refrigerant for the cycle.

The circulation passage is composed of a cool-water pipe 17 and a hot-water pipe 18 connected to the both ends of the liquid passage of the heat exchanger 5. An upstream side end of the cool-water pipe 17 is connected to a flow outlet 2a provided at the lower portion of the reservoir 2, and a downstream side end of the hot-water pipe 18 is connected to a flow inlet 2b provided at the upper portion of the reservoir 2.

The water pump 3 is provided in the cool water pipe 17 (otherwise, in the hot-water pipe 18), and rotates upon receiving electricity to conduct liquid from the reservoir 2 into the circulation passage. Incidentally, liquid flows, as indicated by solid line arrows in FIG. 1, in a route of the lower portion of the reservoir 2→the cool-water pipe 17→the liquid passage in the heat exchanger 5→hot-water pipe 18→the flow inlet 2b→the upper portion of the reservoir 2.

The control unit electrically controls the compressor 4 (electric motor), the fan 16, the water pump 3, and the expansion valve 6, thereby controlling (ordinarily operating) the temperature of liquid stored in the reservoir 2. Further, the control unit controls a defrosting operation as a defrosting control unit for removing frost of the exterior heat exchanger 7 in accordance with a detection value of a temperature sensor 19 for detecting an outlet temperature of the exterior heat exchanger 7. The defrosting operation is started when the detection value is decreased to about −5° C., and stopped when the detection value is increased to about 10° C.

Next, operations in the present embodiment are explained.

At the ordinary operation for heating liquid in the reservoir 2 by conducting liquid into the heat exchanger 5, the water pump 3 controls an amount of liquid conducted into the heat exchanger 5 so that liquid is heated in the heat exchanger to have a specific temperature (for instance, 85° C.). Since the heat exchanger 5 is constructed so that the refrigerant flow direction is opposed to the liquid flow direction, the temperature of liquid flowing in the heat exchanger 5 is raised as liquid approaches the liquid outlet from the liquid inlet. The opening degree of the expansion valve 6 (opening cross-sectional area of the valve orifice 15) is controlled by the control unit so that the pressure of refrigerant (discharge pressure of the compressor 4) at the refrigerant inlet of the heat exchanger 5 corresponds to the temperature necessary for raising the temperature of liquid to the specific value.

When the outlet temperature of the exterior heat exchanger 7 is lowered to approximately −5° C. (as a temperature detected by the temperature sensor 19) during the ordinary operation described above, the ordinary operation is switched to the defrosting operation. At the defrosting operation, the water pump 3 is stopped, and the opening degree of the expansion valve 6 is controlled to be larger than that at the ordinary operation. For instance, the expansion valve 6 is fully opened. Accordingly, hot gas discharged from the compressor 4 emits a reduced amount of thermal energy in the heat exchanger 5, and the decrease in temperature of hot gas is also reduced due to the decrease in pressure in the expansion valve 6. As a result, hot gas discharged from the compressor 4 can reach the exterior heat exchanger 7 without largely lowering the temperature thereof, and performs defrosting of the exterior heat exchanger 7.

In the hot-water supply system 1 according to the present embodiment, the ordinary operation is readily switched to the defrosting operation by stopping the water pump 3 and by increasing the opening degree of the expansion valve 6 from that at the ordinary operation. Additional functional parts (for instance, four-way valve, switching valve, and the like) need not be provided to perform the defrosting operation, preventing complication of the cycle construction and increase in system cost.

In the heat pump cycle C according to the present embodiment, refrigerant is pressurized at the high pressure side to have a critical pressure of refrigerant ($CO_2$) at least. However, since functional parts such as a four-way valve and a switching valve are not disposed in the cycle for defrosting, reliability is improved as compared to a cycle including the four-way valve, the switching valve, and the like, and cost reduction is realized simultaneously. The expansion valve 6 in the present embodiment is always opened. Even at the ordinary operation, the expansion valve 6 is not fully closed, through the opening degree is controlled appropriately. Therefore, even when $CO_2$ is used as refrigerant, a high accurate sealing property resistant to high pressure is not required for the expansion valve 16. The expansion valve 6 can be therefore produced at low cost.

Second Embodiment

In a second preferred embodiment, the water pump 3 is inversely rotated at the initial stage of the defrosting operation. When the water pump 3 is stopped at the defrosting operation, at the defrosting operation starting initial stage, the temperature of hot gas discharged from the compressor 4 is lowered while passing through the heat exchanger 5 by liquid remaining in the heat exchanger to increase the temperature of the body of the heat exchanger 5. The defrosting time is lengthened by the time for raising the temperature of the heat exchanger 5.

As opposed to this, in the present embodiment, since the water pump 3 is inversely rotated at the defrosting operation starting initial stage, as shown in a broken line arrow in FIG. 1, heated liquid in the reservoir 2 can be supplied to the heat exchanger 5 in an inverse direction. As a result, the temperature of the body of the heat exchanger 5 is raised to suppress the decrease in temperature of hot gas. The thermal loss of hot gas in the heat exchanger 5 is reduced, and the build up time of the defrosting operation is shortened, thereby shortening the defrosting time entirely.

Incidentally, in the present embodiment, the rotation (inverse rotation) of the water pump 3 is stopped when the temperature of the body of the heat exchanger 5 is raised to a specific temperature (for instance, to the temperature of hot gas introduced into the heat exchanger 5). Accordingly, the thermal energy of liquid consumed for raising the temperature of the body of the heat exchanger 5 can be minimized, and the thermal energy utilized for supplying hot water can be secured.

Third Embodiment

Figure 3:
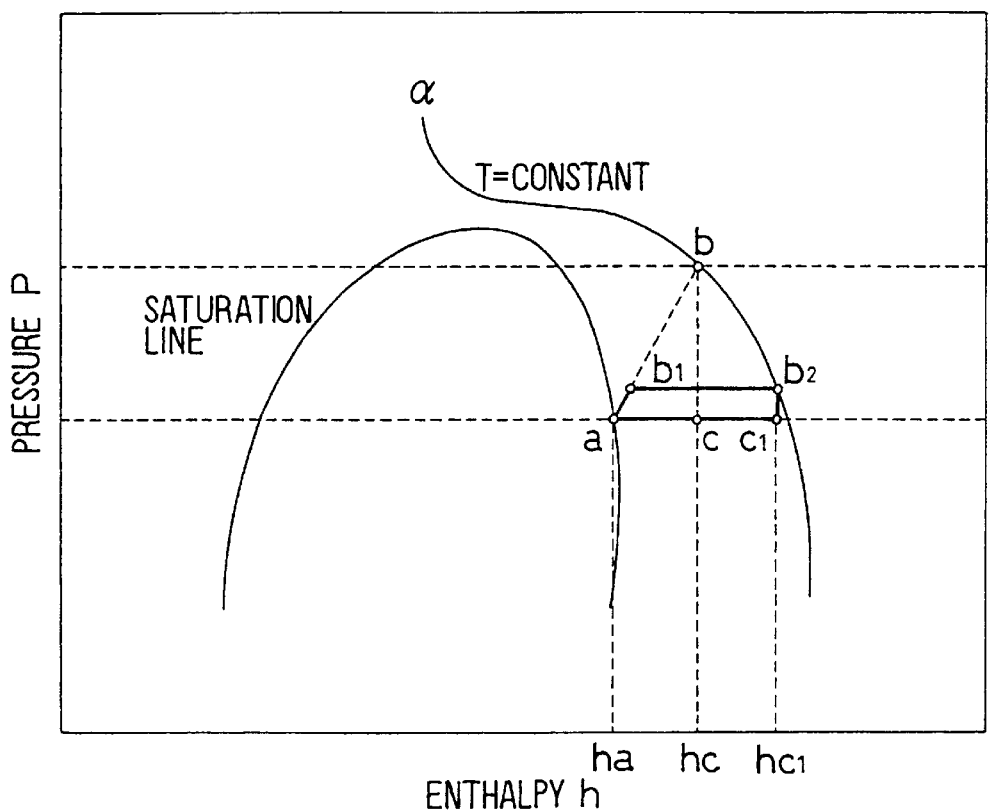
FIG. 3 is a Mollier diagram showing operation states in a heat pump cycle in a third preferred embodiment.

In a third preferred embodiment, the water pump 3 is inversely rotated during the defrosting operation. In a Mollier diagram shown in FIG. 3, the general operation (ordinary operation) of the super critical heat pump cycle C forms a cycle composed of a→b→c→a. A defrosting capability is determined by a difference in enthalpy of (hc-ha).

On the other hand, when the water pump 3 is inversely rotated during the defrosting operation and heated liquid is kept flowing from the reservoir 2 into the heat exchanger 5, refrigerant is heated by the heated liquid while passing through the heat exchanger 5. Assuming that the temperature of refrigerant is $b_2$ on an isothermal line a in the Mollier diagram, a cycle composed of a→$b_1$→$b_2$→$c_1$→ a is provided. The defrosting capability is represented by a difference in enthalpy of ($hc_1$-ha), which is larger than that at the ordinary operation. As a result, the defrosting time is shortened.

Incidentally, the defrosting time is very short as compared to the operation time of the ordinary operation. Therefore, even when the water pump 3 is continuously inversely rotated during the defrosting operation, the amount of liquid used for the defrosting operation is so extremely small as compared to the entire amount of liquid stored in the reservoir 2 that the shortage of liquid does not occur.

Fourth Embodiment

Figure 4:
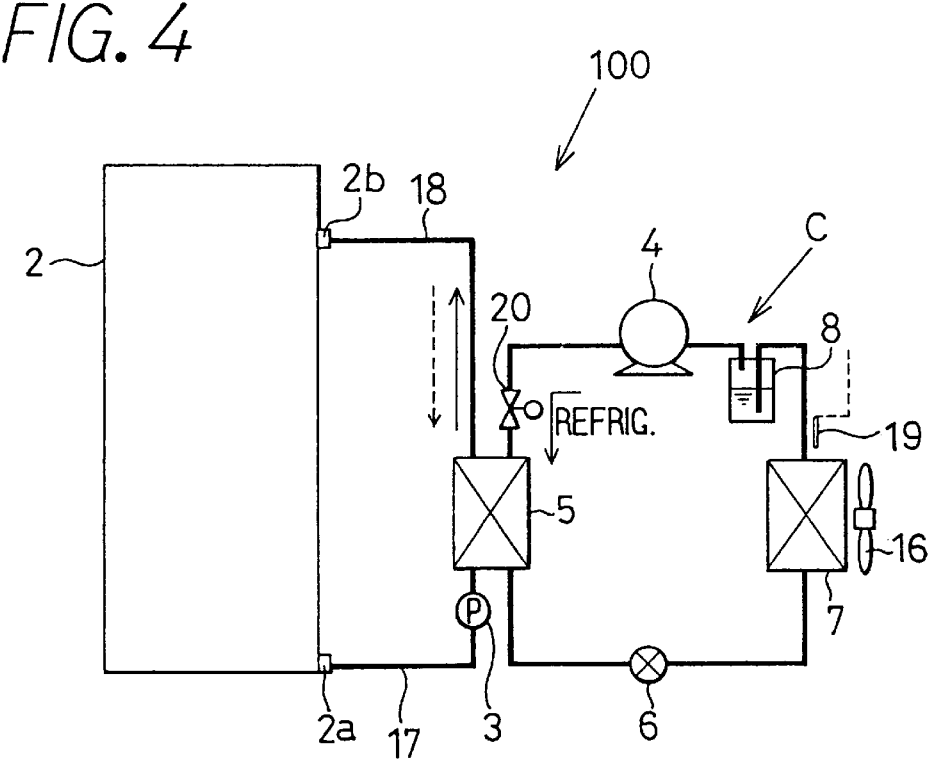
FIG. 4 is a block diagram showing a heat pump type hot-water supply system in a fourth preferred embodiment.

FIG. 4 shows a heat pump type hot-water supply system 100 in a fourth preferred embodiment. In this embodiment, as shown in FIG. 4, a resistor (passage are a changeable member) 20 is disposed between the compressor 4 and the heat exchanger 5 to electrically control the cross-sectional area of the passage therebetween. The resistor 20 fully opens the cross-sectional area of the passage at the ordinary operation, and reduces the cross-sectional area of the passage at the defrosting operation.

Figure 5:
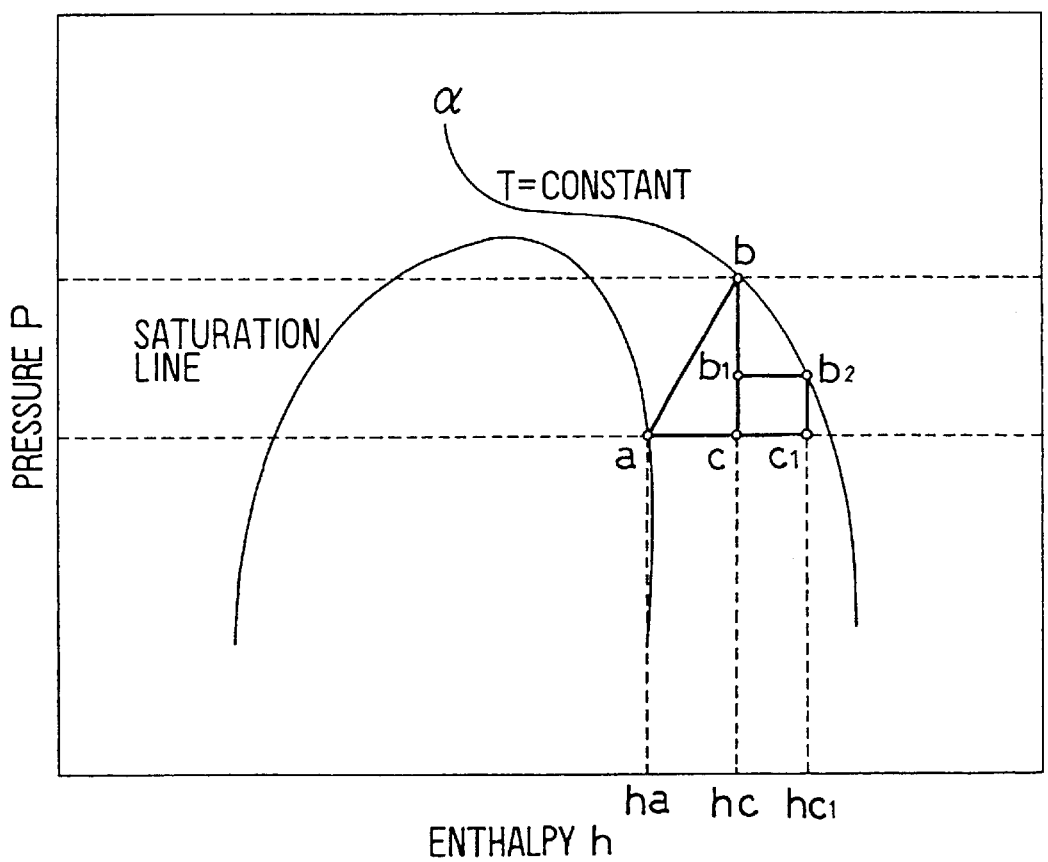
FIG. 5 is a Mollier diagram showing operation states in a heat pump cycle in the fourth embodiment.

Accordingly, the ordinary operation provides a cycle composed of a→b→c→a in the Mollier diagram shown in FIG. 5 as explained in the third embodiment. On the other hand, at the defrosting operation, the resistor 20 throttles the pressure of refrigerant so that the pressure of refrigerant is decreased at the downstream side of the resistor 20. Simultaneously, the water pump 3 is inversely rotated to heat refrigerant by hot water. Accordingly, assuming that the temperature of refrigerant is $b_2$ on an isothermal line a in the Mollier diagram, a cycle composed of a→b→$b_1$→$b_2$→$c_1$→ a is provided. The defrosting capability is a difference in enthalpy of ($hc_1$-ha), which is improved as compared to that at the ordinary operation. As a result, the defrosting time can be shortened.

Especially in the present embodiment, the compressor 4 increases the enthalpy of refrigerant so that the enthalpy can be used for defrosting. Therefore, an amount of thermal energy of liquid (hot water) consumed at the defrosting operation is so extremely small even when the water pump 3 is continuously inversely rotated during the defrosting operation that shortage of liquid in the reservoir 2 does not occur.

While the present invention has been shown and described with reference to the foregoing preferred embodiments, it will be apparent to those skilled in the art that changes in form and detail may be made therein without departing from the scope of the invention as defined in the appended claims.

For instance, in the second to fourth embodiments, the water pump 3 is inversely rotated to supply liquid (hot water) from the reservoir 2 into the heat exchanger 5 when the defrosting operation is performed. However, a valve or the like can change suction route and discharge route of the water pump 3. Otherwise, another water pump other than the water pump 3 described above may be provided to work only for the defrosting operation.

In the embodiments described above, liquid (hot water) stored in the reservoir 2 can be used as it is as potable water, water for baths, and the like. Otherwise, liquid in the reservoir 2 may be used as thermal medium for heating potable water, water for baths, and the like. Liquid in the reservoir 2 may be also used for floor heating or interior air conditioner in addition to for supplying hot water.

What is claimed is:

1. A heat pump type hot-water supply system comprising:
    a heat pump cycle including refrigerant, a compressor, a first heat exchanger, a pressure-reducing device, and a second heat exchanger which are annularly connected to each other, said pressure reducing device including a variable sized orifice;

a defrosting control unit for defrosting the second heat exchanger during a defrosting operation by controlling an opening degree of the pressure-reducing device, all refrigerant flowing to said second heat exchanger flowing through said variable sized orifice during the defrosting operation;

a reservoir for storing liquid that is to be heated during an ordinary operation;

a circulation pipe passing through the first heat exchanger so that the liquid in the reservoir circulates in the circulation pipe while passing through the first heat exchanger;

a pump for circulating the liquid in the circulation pipe, wherein:

the opening degree of the variable orifice of the pressure-reducing device during the defrosting operation is controlled by the defrosting control unit to be larger than that during the ordinary operation; and the defrosting control unit stops an operation of the pump a the defrosting operation.

2. The heat pump type hot-water supply system of claim 1, wherein $CO_2$ flows in the heat pump cycle as refrigerant.

3. A heat pump type hot-water supply system comprising:

a heat pump cycle including a compressor, a first heat exchanger, a pressure-reducing device, and a second heat exchanger which are annularly connected to each other;

a defrosting control unit for defrosting the second heat exchanger in a defrosting operation by controlling an opening degree of the pressure-reducing device;

a reservoir for storing liquid that is to be heated in an ordinary operation;

a circulation pipe passing through the first heat exchanger so that the liquid in the reservoir circulates in the circulation pipe while passing through the first heat exchanger; and a pump for circulating the liquid in the circulation pipe, wherein:

the opening degree of the pressure-reducing device in the defrosting operation is controlled by the defrosting control unit to be larger than that in the ordinary operation; and the liquid heated and stored in the reservoir is supplied into the first heat exchanger in the defrosting operation.

4. The heat pump type hot-water supply system of claim 3, wherein $CO_2$ flows in the heat pump cycle as refrigerant.

5. The heat pump type hot-water supply system of claim 3, wherein the first heat exchanger is heated to have a specific temperature by the liquid heated and supplied into the first heat exchanger.

6. The heat pump type hot-water supply system of claim 5, wherein the defrosting control unit stops the liquid from being supplied into the first heat exchanger when the first heat exchanger has the specific temperature.

7. The heat pump type hot-water system of claim 3, wherein the liquid heated and stored in the reservoir is continuously supplied into the first heat exchanger during the defrosting operation.

8. The heat pump type hot-water system of claim 3, wherein the pump is inversely rotated at the defrosting operation to supply the liquid into the first heat exchanger in a direction opposite to a direction in which the liquid flows at the ordinary operation.

9. The heat pump type hot-water system of claim 3, further comprising a passage area changeable member for changing a cross-sectional area of a passage connecting the compressor and the first heat exchanger therebetween in which refrigerant flows, wherein:

the passage area changeable member decreases the cross-sectional area of the passage at the defrosting operation as compared to that at the ordinary operation.

10. The heat pump type hot-water supply system of claim 3, wherein:

the compressor is disposed to compress and discharge high-pressure high-temperature refrigerant;

the first heat exchanger is disposed to perform heat exchange between refrigerant discharged from the compressor and the liquid flowing from the reservoir to heat the liquid in the ordinary operation;

the pressure-reducing device is an expansion valve which is disposed to decompress refrigerant flowing from the first heat exchanger in accordance with the opening degree; and the second heat exchanger is disposed to perform heat exchange between refrigerant flowing from the pressure-reducing device and outside air.

11. The heat pump type hot-water supply system of claim 3, wherein, in the ordinary operation, the opening degree of the pressure-reducing device is changed in a predetermined opening-degree range; and in the defrosting operation, the defrosting control unit controls the opening degree of the pressure-reducing device to a degree larger than that in the predetermined opening-degree range.

12. The heat pump type-hot water supply system of claim 3, wherein, even in the defrosting operation, refrigerant flowing from the first heat exchanger flows into the second heat exchanger after entirely passing through he pressure-reducing device.

13. A hot-water supply system comprising:

a reservoir for storing liquid therein;

a refrigerant cycle including a compressor for compressing refrigerant, a first heat exchanger for performing heat exchange between refrigerant discharged from the compressor and the liquid from the reservoir to heat the liquid in an ordinary operation, a pressure-reducing device for decompressing refrigerant from the first heat exchanger, and a second that exchanger for performing heat exchange between refrigerant and outside air in the ordinary operation;

a pump for circulating the liquid between the reservoir and the first heat exchanger; and a control unit for performing a defrosting operation of the second heat exchanger in a defrosting operation, wherein, in the defrosting operation, the control unit controls an opening degree of the pressure-reducing device to be larger than that during the ordinary operation, while the pump operates.

* * * * *